Feb. 5, 1935.    J. W. BRYCE    1,990,265
EVEN BALANCE SCALE
Filed July 19, 1932    2 Sheets-Sheet 1

INVENTOR
James W. Bryce
BY
A. C. Maby
ATTORNEY

Feb. 5, 1935.  J. W. BRYCE  1,990,265
EVEN BALANCE SCALE
Filed July 19, 1932  2 Sheets-Sheet 2

Patented Feb. 5, 1935

1,990,265

UNITED STATES PATENT OFFICE 1,990,265

EVEN BALANCE SCALE

James W. Bryce, Bloomfield, N. J., assignor, by mesne assignments, to The Hobart Manufacturing Company, Troy, Ohio, a corporation of Ohio Application July 19, 1932, Serial No. 623,355

2 Claims. (Cl. 265—59)

This case relates to even balance scales and particularly to scales using a spring counterbalance for resisting the loads in addition to the manually placed weights on the weight pan.

The object of this invention is to provide an improved spring counterbalance for scales of the over-and-under or even balance type.

Another object is to provide a single coil spring counterbalance which will counteract movement of the beams in under or over direction from neutral.

Further, the object of the invention is to provide a coil spring which will be initially tensioned when the beam is in neutral position so that when the beam moves in one direction it will increase the tension of the spring while when the beam moves in the opposite direction it will decrease the tension of the spring.

Still further, an object of the invention is to provide a thermostat mounting for the coil springs so that the indicator of the scale will always remain at the zero position when there is no load on the scale regardless of the temperature conditions.

Further and other objects and advantages will be hereinafter set forth in the accompanying specification and claims, and shown in the drawings which by way of illustration show what are not considered as the preferred forms of the invention.

In the drawings:

Fig. 4 shows a modification of the mounting for the spring counterbalance to provide thermostatic compensating means for temperature changes tending to lengthen or shorten the spring; and Fig. 5 is an enlarged detail, end, sectional, view of the pivotal connection between the spring counterbalance and a plate element carried by the scale beam.

Figure 1:
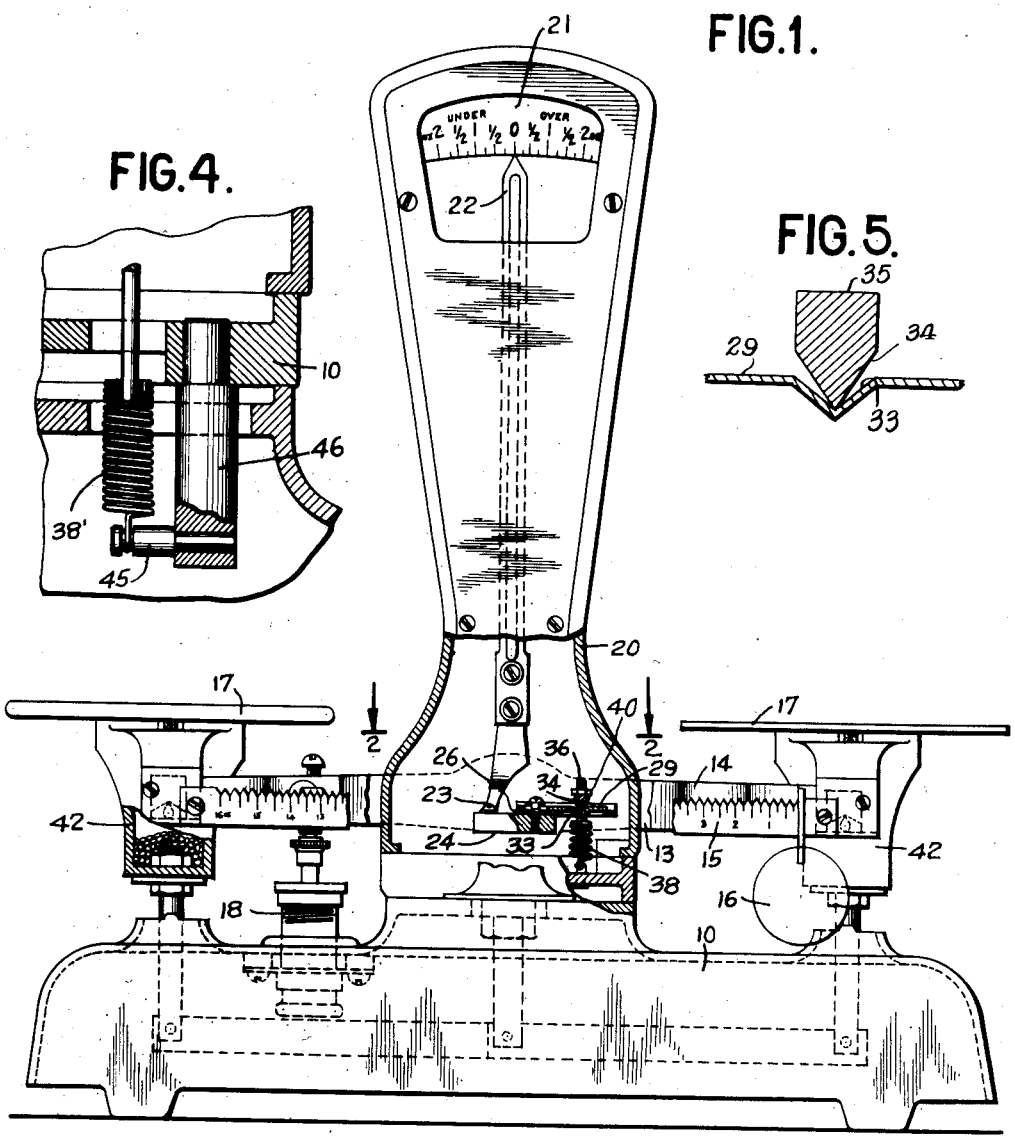
Fig. 1 is a front elevational view of the scale with one form of mounting for the coil spring counterbalance.
Figure 2:
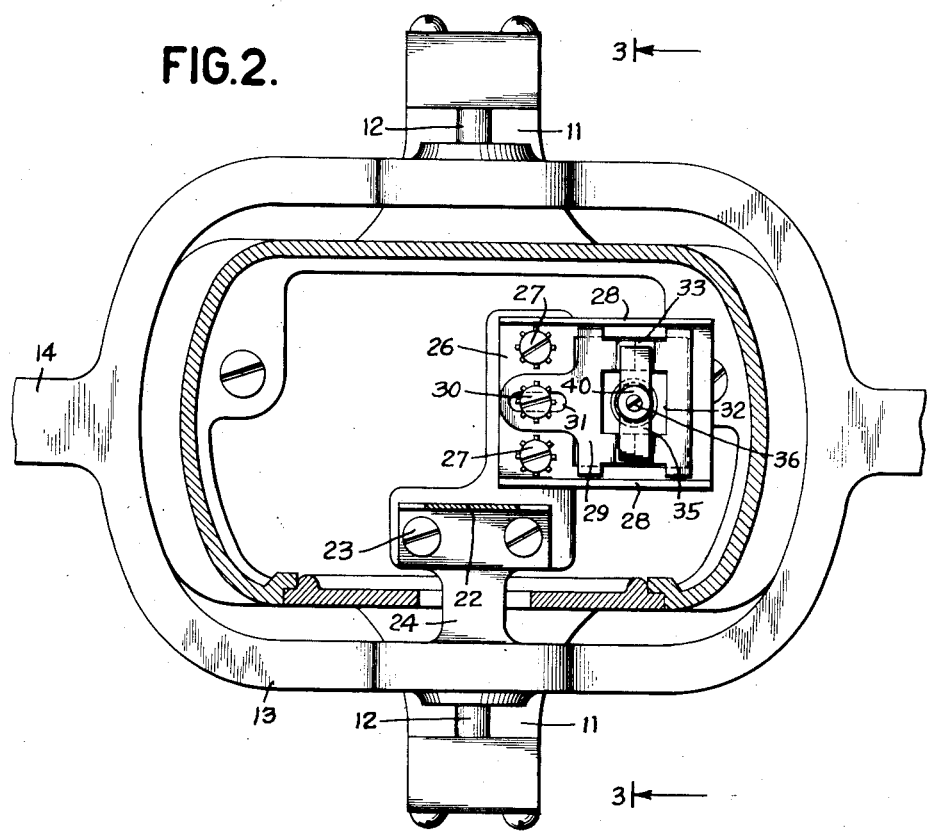
Fig. 2 is a section along line 2—2 of Fig. 1.
Figure 3:
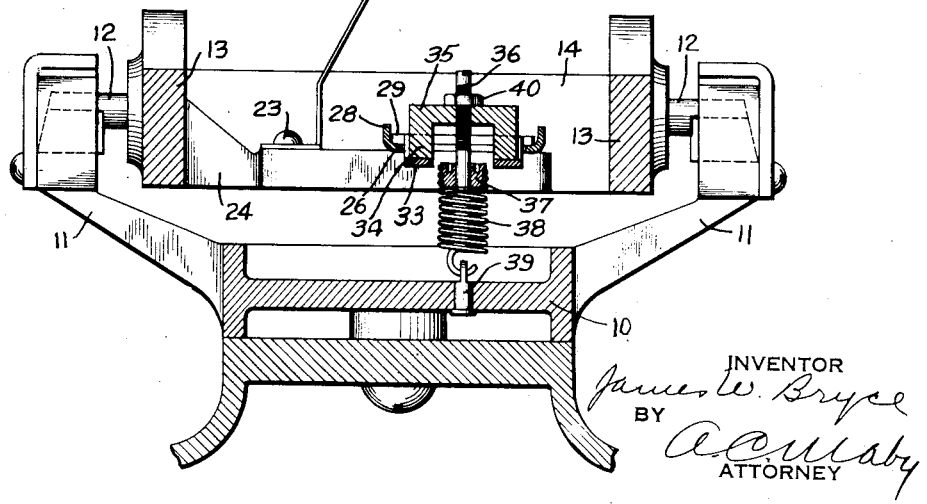
Fig. 3 is a section along line 3—3 of Fig. 2.

Referring to the drawings in detail, the scale comprises a base housing and frame 10 having fulcrum standards 11 at each side supporting the knife edges 12 fixed to opposite sides of the central loop 13 of the even balance beam 14. The beam 14 has secured thereto the usual tare bar 15 carrying poise 16, each end of the beam supporting a pan 17 one of which may be used to carry a load while the other may be used to carry manually positioned drop weights. The dash pot 18 is provided to dampen the oscillation of the beam. Extending upwardly from base 10 through loop 13 of the beam is the fan housing 20 having at its upper end an under-and-over chart 21 coacting with a pointer 22 fixed at its lower end by screws 23 to a horizontal bracket 24 integral with one side of the loop 13 and projecting inwardly from this side of the loop into housing 20. Bracket 24 has secured thereto by screws 27, the guide plate 26 the sides of which are turned up to provide guide flanges 28. Engaging these flanges and adjustable therealong is a plate 29 which is secured at the rear end to the guide plate 26 and the bracket 24 by means of a central screw 30 passing through a slot 31 in the plate 29 extending parallel to the length of the beam and threaded into the bracket 24. When screw 30 is loosened, plate 29 may be adjusted longitudinally of the beam for a purpose hereinafter brought out.

Plate 29 has a large central hole 32 and at opposite sides of the hole it is formed with V-shaped depressions 33 for coacting with the V-edged ends 34 of the legs of a U-shaped pivot 35. The V-edged ends 34 are narrower than V-shaped depressions 33 and seat in the latter in the same manner as an ordinary knife edge, such as 12, seats in its V-grooved bearing block. In effect V-edged ends 34 constitute knife edges rockably coacting with the V-shaped depressions 33 which are equivalent to ordinary V-grooved bearing blocks. In this manner, the pivot 35 is rockably mounted on plate 29 and in turn the latter will rockably coact with ends 34 of pivot 35 as the beam 14 tilts. Through the base of pivot 35 and passing through opening 32 in plate 29 is threaded a screw 36 on the lower end of which is swiveled a threaded plug 37 on which the upper end of the spring 38 is threaded. By adjusting the plug in or out of the spring coils, a zero adjustment is effected. The lower end of the spring is hooked to a stud 39 anchored to the frame 10. Turning of screw 36 adjusts the initial tension of the spring and provides a further zero adjustment for the indicator. After the screw 36 has been adjusted to proper position, it is locked by means of a nut 40 threaded thereon.

Each pan 17 has the usual shot cup 42, the left hand cup which is on the weight pan having a preponderance of weight which would overbalance the beam to rock it counterclockwise were spring 38 omitted. The spring 38, however, counteracts the preponderance of weight on the left side of the beam, in the same manner and to the same effect as though the zero position of the indicator had been at the right hand "2 oz."

mark and 2 oz. had been placed on the left pan to bring the indicator to the central point of the chart, marked "0". At this point, the spring is tensioned and there is no load on either pan. When a load is placed on the right hand pan, beam 14 rocks clockwise, moving plate 29 likewise and due to the pivotal or rockable connection between the plate and pivot 35, permitting the latter to remain vertical while descending. As the pivot 35 descends, the spring tension is decreased and the indicator indicates on the right hand side of the chart the load on the right hand pan. When a load is placed on the left hand pan, beam 14 rocks counterclockwise, moving plate 29 likewise which through its pivotal connection with pivot 35 raises the latter without tilting it. As the pivot 35 rises, the tension of the spring is increased and the indicator shows the load on the left hand side of the chart. By tensioning the spring initially, it remains under tension throughout the range of the beam so that it need never act under compression in resisting the movement of the beam. Were the spring permitted to act sometimes under tension and other times under compression, it would be impracticable to accurately calibrate the scale.

The direct engagement of the knife edges 34 with depressions 33 of plate 29 determines the point of connection between the spring and beam. In order that there be as little friction as possible at this connecting point, the plate 29 is positioned substantially on the range line of the beam, that is, the mean line passing through the beam pivot and the pan pivots.

In order to seal the scale, the plate 29 is adjusted longitudinally of the beam by loosening screw 30 and shifting the plate in the direction permitted by slot 31 of the plate, thus changing the point of connection between the beam and the counterbalance spring so that the moment arm of the spring on the beam is changed. This means that the spring will exert more or less counterbalancing action throughout the movement of the beam in accordance with the moment arm of the spring. This is evident when it is considered that the closer the spring connection is to the fulcrum of the beam the less displacement the spring will have upon a given movement of the beam.

As the spring is moved further out on the beam it will be displaced a greater amount for the same given movement of the beam. After the correct moment arm of the spring has been found, screw 36 and plug 37 are adjusted to provide the zero calibration.

Fig. 4 shows a modification in which the stud 45 carrying the lower end of the spring 38' extends horizontally from a vertically disposed thermostatic bar 46 secured at its upper end to the frame 10.

While there has been shown and described and pointed out the fundamental novel features of the invention as applied to two modifications, it will be understood that various omissions and substitutions and changes in the form and details of the devices illustrated and in their operation may be made by those skilled in the art without departing from the spirit of the invention. It is the intention therefore to be limited only as indicated by the scope of the following claims.

What is claimed is as follows:

1. In a scale, a frame, an even balance beam rockably mounted on the frame and having load supports at opposite ends and overweighted to normally move in one direction, a generally vertical coil spring for opposing movement of the beam in said direction, a guide element rigid on the beam, a plate guided for movement along the guide element in a direction longitudinal of the beam, means for securing the plate relative to the guide in any of the adjusted positions of the plate, a vertical stem connected to one end of the spring, a member rockably mounted on the plate for carrying said stem, and an anchoring connection between the frame and the opposite end of said spring.

2. In a scale as defined in claim 1, said member and said stem being relatively vertically adjustable, and means for maintaining them in adjusted position.

JAMES W. BRYCE.